(12) United States Patent
Monga et al.

(10) Patent No.: US 12,407,585 B2
(45) Date of Patent: Sep. 2, 2025

(54) MANAGING DYNAMIC MESSAGING USING A KAFKA-BASED MONITORING APPLICATION

(71) Applicant: JP Morgan Chase Bank, N.A., New York, NY (US)

(72) Inventors: Varun Monga, Newark, DE (US); Dan Bodalski, Swedesboro, NJ (US); Nada Ziab, Wilmington, DE (US); Maxwell Janney, Wilmington, DE (US)

(73) Assignee: JP Morgan Chase Bank, N.A., New York, NY (US)

( * ) Notice: Subject to any disclaimer, the term of this patent is extended or adjusted under 35 U.S.C. 154(b) by 0 days.

(21) Appl. No.: 18/541,819

(22) Filed: Dec. 15, 2023

(65) Prior Publication Data

US 2025/0202782 A1 Jun. 19, 2025

(51) Int. Cl.
*H04L 41/5025* (2022.01)

(52) U.S. Cl.
CPC .............................. *H04L 41/5025* (2013.01)

(58) Field of Classification Search
None
See application file for complete search history.

(56) References Cited

U.S. PATENT DOCUMENTS

| | | | |
|---|---|---|---|
| 10,193,822 B1 * | 1/2019 | Bacus | H04L 47/83 |
| 2019/0138367 A1 * | 5/2019 | Bishop | G06F 9/5083 |
| 2019/0149504 A1 * | 5/2019 | Norwood | H04L 51/18 |
| | | | 709/206 |
| 2019/0268278 A1 * | 8/2019 | Kaitha | H04L 41/147 |
| 2021/0157649 A1 * | 5/2021 | Ibryam | G06F 9/52 |
| 2021/0306431 A1 * | 9/2021 | Giannetti | H04L 67/1036 |
| 2024/0103931 A1 * | 3/2024 | Ravi | G06F 11/302 |

FOREIGN PATENT DOCUMENTS

CN 110633151 A * 12/2019 ............ G06F 9/505

OTHER PUBLICATIONS

English Translation of CN110633151, 10 pages, published Dec. 2019.*

* cited by examiner

*Primary Examiner* — Joshua Joo
(74) *Attorney, Agent, or Firm* — Wood IP Law, LLC; Theodore A. Wood

(57) ABSTRACT

A method and system performing a method for managing dynamic messaging using a Kafka-based monitoring application deployed within a cloud environment having at least one software application in operation is provided. The Kafka-based monitoring application monitors consumer lag for a specific topic associated with the software application, schedules queries to detect consumer lag for the specific topic at predetermined intervals. detects, via an application programming interface in communication with the Kafka-based monitoring application, any consumer lag and retrieves a list of any affected consumers and associated consumer information; and determines one or more pools of the affected consumers, and performs a scaling operation to scale up or down consumers on the one or more pools based on the consumer lag detected.

20 Claims, 5 Drawing Sheets

MANAGING DYNAMIC MESSAGING USING A KAFKA-BASED MONITORING APPLICATION

FIELD OF TECHNOLOGY

The present disclosure relates generally to machine learning (ML) and, in particular, to dynamic messaging using a Kafka-based monitoring application.

BACKGROUND

Kafka is a stream processing system used, for example, for messaging, event sourcing, and data analytics. In Kafka-based systems, real-time flows are widely employed for event-based architectures. Kafka is architecturally divided into producers, platforms, brokers, and consumers. The producer is responsible for producing messages to the platform that is responsible for hosting messages, and the load balancing of production and consumption, and the consumer pulls the messages required by the consumer from the platform. Events that are created by producers and are sent to the brokers for specific topics.

When a consumer receives an event from a broker, they process it and inform the broker the event has been committed. Applications or services that need to receive messages will use a consumer to receive messages for the specific topics. During a burst of events received by the broker, when a consumer cannot process the events quickly, this results in an increased lag time at the consumer level that affects both the functionality of the applications and the efficiency of the overall eco-system.

Currently, GAIA marketplace offers an auto-scale service for GAIA applications, however it can only scale certain applications based on a limited set of application metrics such as central processor unit (CPU) utilization, HTTP throughput and HTTP latency. In Kafka-based monitoring applications which are based on event-driven architecture, problems exists such as the consumers not being able to keep up with the rate a producer is producing events resulting in significant lag time on the messaging broker, thereby creating serious risks to the application infrastructure and production stability.

As such, a need exists for systems and methods that to manage the dynamic messaging by matching the pace of production and consumption process while also efficiently managing utilization of resources.

SUMMARY

The present disclosure, through one or more of its various aspects, embodiments, and/or specific features or sub-components, provides, inter alia, various systems, servers, devices, methods, media, programs, and platforms for managing dynamic message production using a Kafka-based monitoring application.

Embodiments of the present disclosure include a method and system performing a method for managing dynamic messaging using a Kafka-based monitoring application deployed within a cloud environment having at least one software application in operation is provided. The Kafka-based monitoring application monitors consumer lag for a specific topic associated with the software application and schedules queries to detect consumer lag for the specific topic at predetermined intervals. Also, the Kafka-based monitoring application detects, via an application programming interface (API) in communication with the Kafka-based monitoring application, any consumer lag and retrieves a list of any affected consumers and associated consumer information. It determines one or more pools of the affected consumers, and performs a scaling operation to scale up or down consumers on the one or more pools based on the consumer lag detected.

In another embodiment, a method is provided for managing dynamic messaging using a machine learning (ML) model to predict actions to be taken by the Kafka-based monitoring application, based on historical data.

In yet another embodiment, a tangible computer-readable medium having stored thereon, computer executable instructions that, if executed by a computing device, cause the computing device to perform the above-mentioned method.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As described herein, various embodiments provide methods for managing dynamic messaging using a Kafka-based monitoring application by matching the pace of production and consumption of messages for a software application being monitored. These methods are applicable in various applications and industries for example, in banking systems, where transactional data (e.g., deposits, debit transactions, credit card and mortgage transactions, investments) from a system of records for different banking product types are produced and retrieved by specific application programming interfaces (APIs). The present invention is not limited to being implemented within any particular system. This system and method according to embodiments herein may also be implemented in various other industries such as Healthcare, E-commerce, Log aggregation and any other industries that leverage Kafka event streaming. In one example Kafka can be used to collect logs from multiple systems and store them in a centralized storage. Applications can be configured to stream logs directly via Kafka messages, which can then be stored in a file or on disk. Furthermore, multiple log files can be transformed into a cleaner resulting in a more straightforward format for interpretation.

Embodiments of the present disclosure will be described herein with reference to a consumer banking environment. Typically, in a consumer banking environment, the banking system retrieves transaction files for a single business day. However, method of the present disclosure enables the system to operate in real-time by implementing Kafka-based monitoring application whereby events and associated transactional data are captured and processed in real-time to improve the end customer experience.

Figure 1:
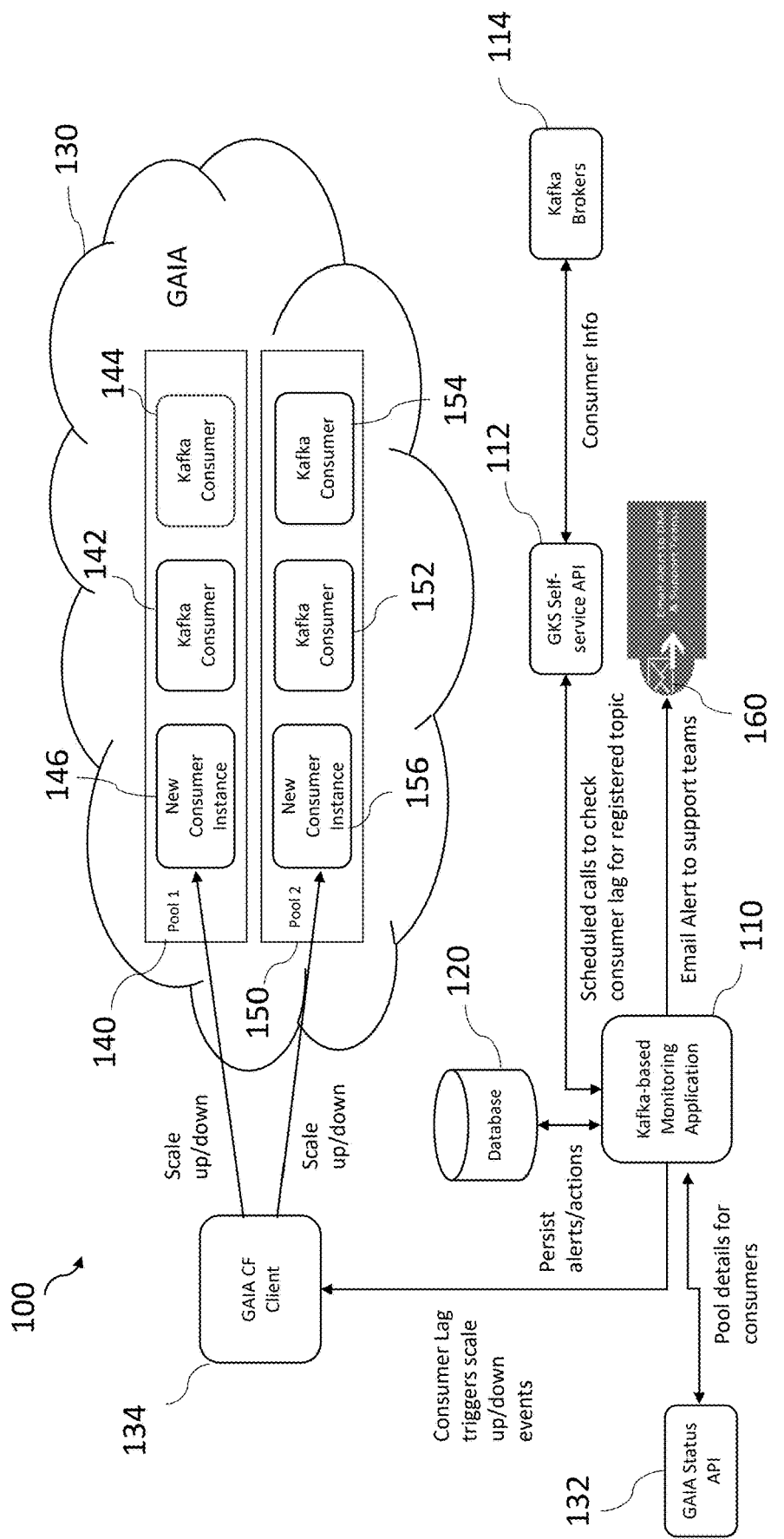
FIG. 1 shows an environment employing a Kafka-based monitoring application for managing dynamic messaging according to one or more embodiments of the present disclosure.

As shown in FIG. 1, an environment 100 is provided having a Kafka-based monitoring application 110 deployed therein for managing dynamic messaging in software applications in operation within the environment according to one or more embodiments. The environment 100 can be a cloud environment, for example a GAIA cloud environment.

The environment 100 includes a GAIA Kafka Service (GKS) Self-Service application programming interface (API) 112, a plurality of Kafka brokers 114, a database 120, a cloud application platform (e.g., GAIA cloud foundry (CF)) 130, a GAIA Status API 132 and a GAIA CF Client 134. The cloud application platform 130 houses a plurality of GAIA pools (e.g., pools 140 and 150) each including a plurality of Kafka consumers 142, 144 and 152 and 154; and new consumer instances 146 and 156 to be added, respectively.

According to embodiments, the Kafka-based monitoring application 110 is platform agnostic. It is a software application housed on a server, for example, a GAIA Kubernetes platform (GKP) platform independent of the environment 100 and deployed therein. That is, the Kafka-based monitoring application 110 is not tied to the environment 100 where it is performing a monitoring operation for applications therein.

According to other embodiments, the Kafka-based monitoring application 110 can be a stand-alone application A GKP platform is a private cloud platform that offers Containers-as-a-Service (CaaS) based on an open-source Kubernetes container orchestration technology. This platform is generally available for application deployments and production clusters which are being deployed in multiple regions and data centers.

As further shown in FIG. 1, the Kafka-based monitoring application 110 is configured to monitor applications within the environment 100. It employs a set of GAIA utility APIs as mentioned, and acts as an orchestrator to assess consumer lag making scaling decisions based on predefined rules. It periodically monitors and verifies the consumer lag at a fixed rate by scheduling queries to check consumer lag for a specific Kafka topic at predetermined intervals.

Figure 2:
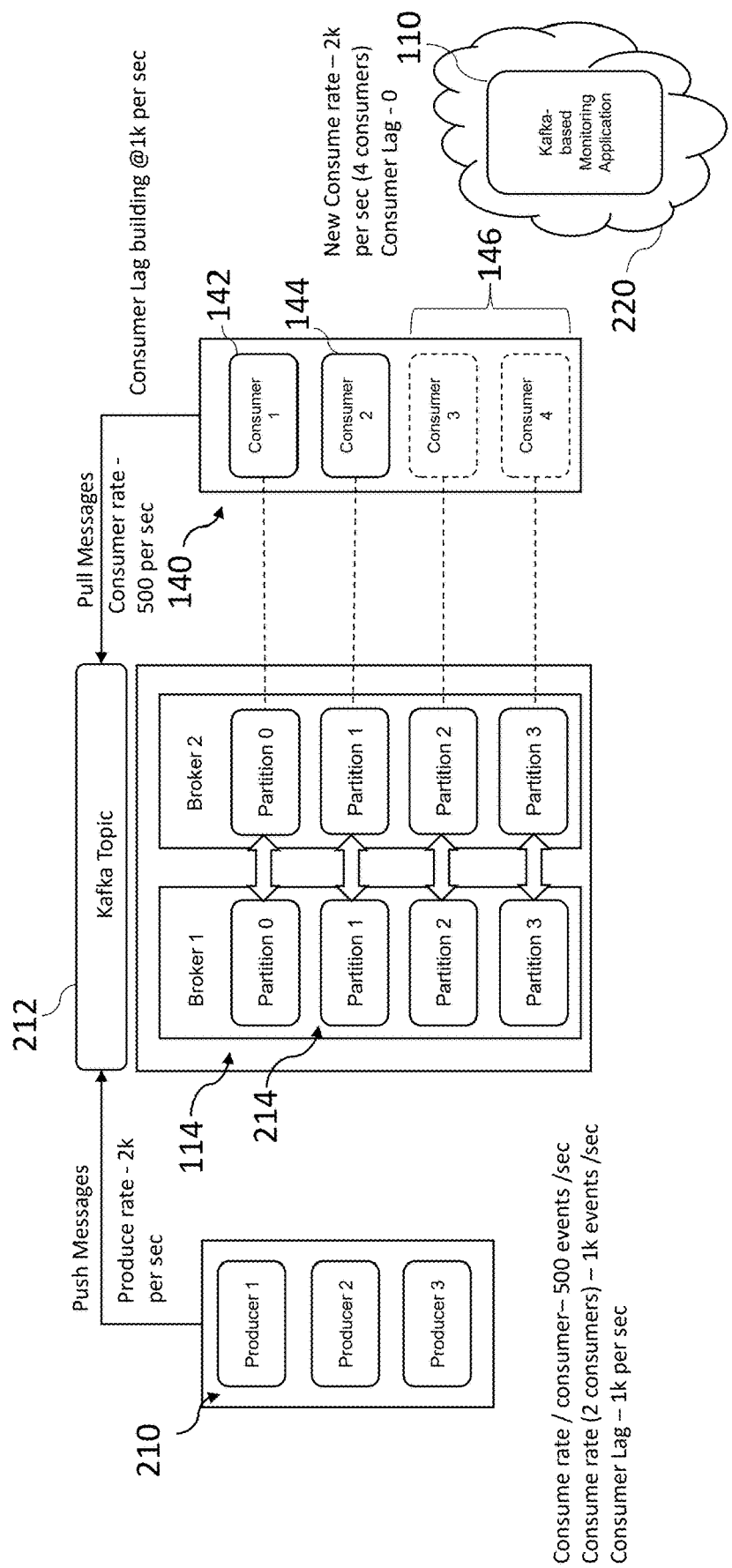
FIG. 2 shows an exemplary relationship between producers, consumers and the Kafka brokers as shown in FIG. 1 according to one or more embodiments of the present disclosure.

By way of example, these checks can be made at 1 minute, 5 minute, 15 minute intervals or similar. This starts by first calling the GKS self-service API 112 with an associated GKS cluster name and consumer group name, for example, for each application it is monitoring to determine if consumer lag exists. In the consumer banking environment, each topic may correspond to different types of events, e.g., a banking transactions event, account balance change event, transaction posted event, or authorization events. The GKS self-service API 112 is an in-house service designed to deliver metrics like consumer lag, consumption rate and production rate for consumer groups operating on all topics configured within a broker (e.g., a Kafka broker 114). Referring now to FIG. 2, as shown, producers 210 push messages at a produce rate of approximately 2 k per second associated with a specific Kafka topic 212 and the messages are pulled by the consumers 142, 144 of pool 140, for example, at a consumption rate of approximately 500 per second. Thus, a consumer lag may build at a rate of approximately 1 k per second. The Kafka-based monitoring application 110 running on a docker container on the GKP platform within a network 220, for example, detects the consumer lag and adds new consumer instances 146, for example. The addition of the new consumer instances 146 increases the consumption rate to approximately 2 k per second thereby reducing the consumer lag to approximately 0k per second. The brokers 114 contain partitions 214 which enable messages to be split in parallel across the brokers 114. The partitions 214 are divided amongst the consumers 142, 144 and new consumer instances 146 where any partition 214 is consumed by an associated consumer 142, 144 or new consumer instance 146.

Referring back to FIG. 1, the GKS self-service API 112 continuously searches for the existence of any consumer lag in the consumption end on the consumers 142, 144, 152, 154 utilizing a tool to determine any consumer lag and retrieves a list of affected consumers and associated consumer information (e.g., IP addresses) from the Kafka brokers 114. The IP address is cross-referenced in the GAIA Status API 132 which determines which pool 140, 150 the application belongs to and the consumer group including consumers 142, 144, 152 154 for the associated pool 140, 150 is then analyzed.

According to an embodiment, a pre-configured lag threshold is determined for each application the Kafka-based monitoring application 110 monitors during an onboarding process of the applications. If the consumer lag level detected exceeds the pre-configured threshold for an application, the Kafka-based monitoring application 110 then translates that to a specific pool 140 or 150 or multiple pools 140, 150 for the affected consumers 142, 144, 152, 154. This occurs by calling the GAIA status API 132 which provides the corresponding pool information for the affecting consumers 142, 144 or 152, 154.

Next, the Kafka-based monitoring application 110 calls the GAIA CF Client 134 to access the cloud application platform 130 and performs a scaling operation (up or down) depending on the existence of consumer lag in the environment 100.

If the consumer lag is across multiple consumers 142, 144, 152, 154, then more consumers will be added across multiple pools 140 and 150. If the consumer lag is detected on a specific pool 140 or 150, the Kafka-based monitoring application 110 shuts down the consumers on that specific pool (e.g., the consumers 142, 144 on pool 140). Then it will scale up the application instances on the other pool (e.g., new consumer instances 156 on pool 150) so that the capacity remains the same within the environment 100.

If the consumer lag is concentrated on a particular pool 140 or 150 e.g., greater than 90%, that application is disabled, and an equal number of instances are added to unaffected pools 140 or 150. If the lag is not concentrated on a particular pool 140 or 150, then the Kafka-based monitoring application 110 determines the correct number of instances necessary for the application based upon its pre-configured threshold.

For example, if the threshold is 600 and the lag is 6000, then the Kafka-based monitoring application 110 determines that the application needs 10 new consumer instances (6000/600=10 instances needed). The Kafka-based monitoring application 110 then determines how many instances the application being monitored has running in all pools 140, 150 via the GAIA CF client 134 and determines if scaling is required.

If scaling is required, the Kafka-based monitoring application 110 evenly distributes the new number of instances 146, 156, across all pools for which the application is deployed. For example, if six (6) new consumer instances are required and the application being monitored is on three (3) pools 140, 150, the Kafka-based monitoring application will determine that each pool 140, 150 receives two (2) new consumer instances. Once the Kafka-based monitoring application 110 performs the necessary scaling, it sends an alert/notification 160 e.g., an email alert to a configurable distribution email list, including a breakdown of the consumer group lag and actions taken.

As mentioned above, the Kafka-based monitoring application 110 is continuously tracking any consumer lag within the applications being monitored to determine if the consumer lag is nearing a pre-configured threshold for an associated application. According to embodiments, when an application onboards to the environment 100, the lag threshold is defined (i.e., pre-configured). For example, the lag threshold can signify a warning needing to be sent to operators or a critical issue, thereby requiring an immediate action to be taken.

With each action detected, the Kafka-based monitoring application 110 sends out alerts and notifications (e.g., alert/notification 160). All actions taken and history of the events are transmitted to and stored within the database 120. Data in the database 120 can be leveraged to train machine learning (ML) algorithm to more effectively and proactively take an action to minimize consumer lag and for reporting, audit, and problem analysis purposes.

According to some embodiments, when the environment 100 expects a burst of events, the Kafka-based monitoring application 110 can perform a schedule-based auto-scaling operation to scale the instances up and down as necessary to accommodate the event traffic. For example, in banking applications, transactional postings typically occur during specific periods of time of the day Therefore, a burst of events are expected and during these periods of time, the environment 100 will scale up new consumer instances as needed.

The Kafka-based monitoring application will then automatically scale down the consumers 142, 144, 152, 154 on the associated pool(s) 140 and/or 150 once these periods of time lapse. For example, based on an anticipated burst of events, at 4:00 am it may scale up a pool 140, 150 by two (2) new consumer instances. At 8:00 am, it may scale back down by two (2) consumer instances to its previous configuration.

New software applications to be onboarded onto the environment 100 do not require application changes or services. The associated configuration of an application being onboarded is defined within the Kafka-based monitoring application 110. The application to be onboarded grants the Kafka-based monitoring application 110 access rights to be able to perform the scaling operations, as needed. When performing an onboarding process of an application, the Kafka-based monitoring application 110 needs certain information associated with the application to be onboarded.

The information needed includes e.g., the GAIA application name, desired permission setting for enabling/disabling of the scale down feature, and the associated GAIA org space to determine which pools to employ the application. The information may also include a cluster name, the consumer group name, an optional configurable lag threshold (e.g., 5000), minimum and maximum consumers, and indicates where to send notifications (i.e., the notification DG) and reporting of audit and problem analysis. Any alerts/notifications 160 to be generated during the scaling operations are then sent out by email, for example, to appropriate personnel, as needed.

According to another embodiment, the Kafka-based monitoring application 110 is not dependent upon the resources of the application which it is monitoring and can easily be decoupled therefrom.

According to another embodiment, the Kafka-based monitoring application 110 also performs intelligent scaling operation based on the actual lag by determining how many instances it has to scale up and is driven by properties defined by the consumer.

If the lag is on a specific consumer or pool 140, 150, it shuts down the pool and adds an equal number of new consumer instances 146 and/or 156 on the unaffected pool 140 or 150. It also performs downscaling once the lag goes down by shutting down the added new consumer instances 146 and/or 156 thereby putting the application back in its previous configuration for efficiency.

According to other embodiments, if there is not sufficient capacity on existing pools 140, 150 to add new consumer instances, the specific application can be scaled up on new pools where that specific application is not already deployed.

Figure 3:
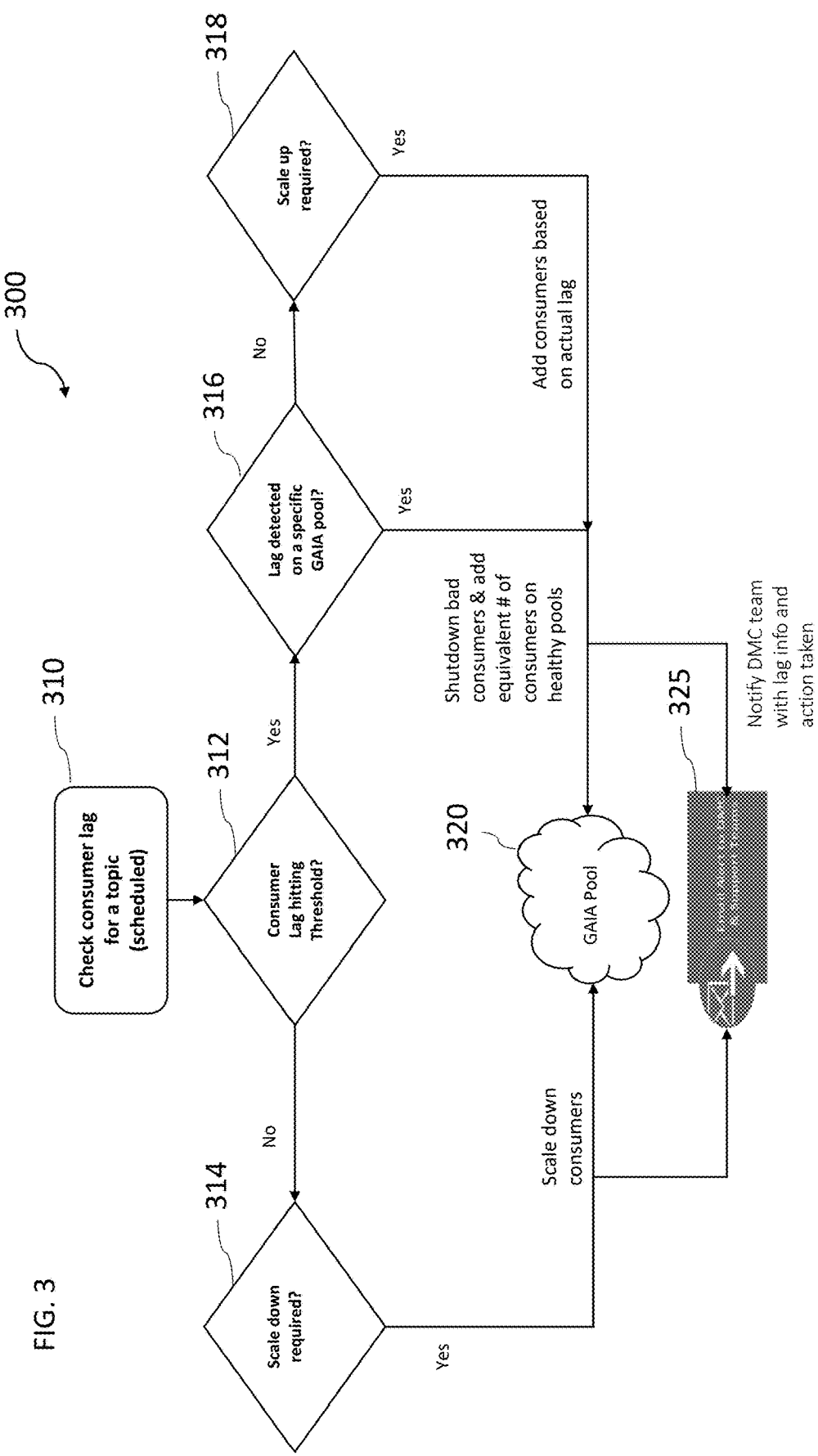
FIG. 3 is a flow diagram showing a method for managing dynamic messaging performed by the Kafka-based monitoring application shown in FIG. 1, according to one or more embodiments of the present disclosure.

In FIG. 3, a flow diagram illustrating a method 300 is provided for managing dynamic messaging using the Kafka-based monitoring application 110 shown in FIG. 1, according to one or more embodiments. The method 300 is described herein with reference to FIG. 1. In this method 300, the Kafka-based monitoring application 110 performs a scheduled lag check on a specific application deployed within the environment 100.

At operation 310, the Kafka-based monitoring application 110 checks for consumer lag for a topic and if it determines that consumer lag exists, the method 200 moves to operation 312. At operation 312, it determines whether the consumer lag is equal to a pre-configurable lag threshold. If not, the process continues to operation 314 where it is determined whether to scale down the consumers 142, 144, 152, 154 at the associated pool 140, 150. The process continues to operation 320 where the GAIA pool (e.g., pools 140, 150) is scaled down and the process moves to operation 325. At operation 325, alert/notifications 160 of actions taken are sent to the appropriate personnel.

If so, then the process continues from operation 312 to operation 316, where it is determined whether the consumer lag detected is on a specific GAIA pool 140, 150. If so, the process continues to operation 320 where the Kafka-based monitoring application 110 shuts down the affected consumers 142, 144, 152, 154 on the specific pool 140, 150 and adds the equivalent number of consumers (e.g., new consumer instances 146, 156) to the unaffected, healthy pool(s).

If at operation 316, the consumer lag detected is not on a specific GAIA pool 140, 150, the process continues to operation 318, where it is determined whether a scale up operation is needed. If yes, then new consumer instances 146, 156 are added to the pool 140, 150, based on actual consumer lag at operation 320. The process continues to operation 325 where alert/notifications 160 regarding consumer lag info and actions taken would be sent out. In some embodiments, the consumers have the option to choose whether they want to initiate autoscaling after an initial alert or when they observe a customizable number of consecutive alerts. So, when the consumer lag hits the threshold but is not detected on a specific pool 140, 150 (at operation 316), at operation 318, additional consumers may be added if the alert condition satisfies a minimum number of consecutive alerts.

Figure 4:
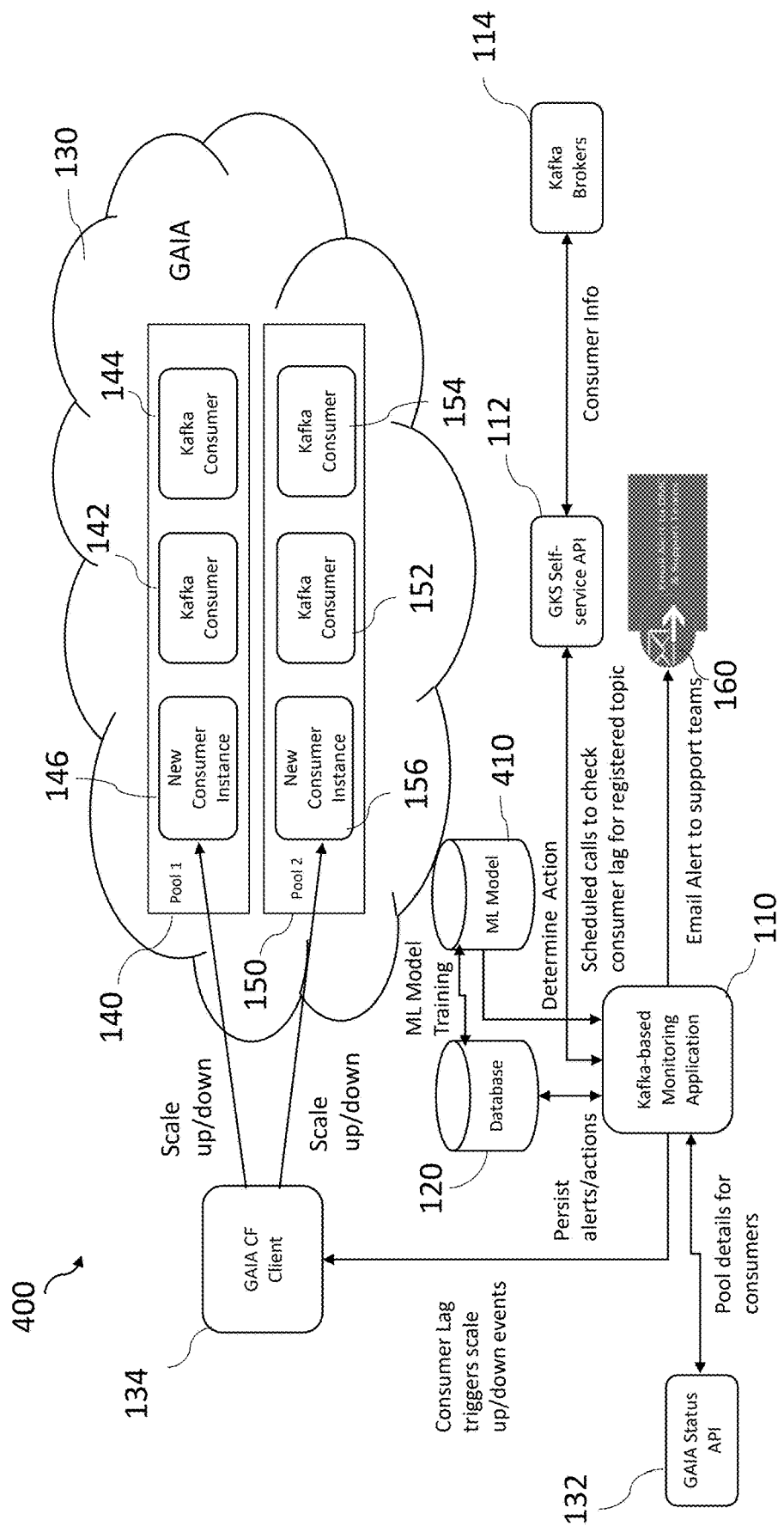
FIG. 4 is an environment employing a Kafka-based monitoring application for managing dynamic messaging using an ML model, according to one or more alternate embodiments of the present disclosure.

FIG. 4 is an environment 400 employing the Kafka-based monitoring application 110 for managing dynamic messaging using a machine learning (ML) model 410, according to one or more alternate embodiments of the present disclosure. The environment 300 illustrates similar components as the environment 200 shown in FIG. 2. Therefore, for purposes of illustration only, the detailed description of these components is omitted.

As shown in FIG. 4, according to one embodiment, the environment 400 employs the ML model 410 to predict consumer lag in software applications, in advance, along with the appropriate number of new consumer instances that should be added during a scaling up operation.

In operation, when the Kafka-based monitoring application 110 determines the whether consumer lag exist for a topic and instructs the GAIA CF client 134 to perform a scaling operation, the event data and other historical data are stored in the database 120. The data is retrieved by the ML model 410 to train the ML model 410 to predict the lag within the applications in advance and to proactively determine when the consumers 142, 144, 152, 156 should be shut down and whether to scale the pool(s) 140, 150 up or down, as needed in advance.

For example, if it is determined that a burst of events occurs on a broker 114 at a certain time period each day, the ML model 410 will be trained to identify patterns including past actions already taken and to capture the metrics at the point of issue/action. This process proactively determines the appropriate action needed and transmits this information to the Kafka-based monitoring application 110 to initiate performance of the appropriate action (i.e., the scaling operation) via the GAIA CF client 134 in a feedback loop. By utilizing a supervised ML algorithm, it can detect in advance, initiate an appropriate action, and send alerts/notifications 160. Any alerts/notifications 160 to be generated during the scaling operations are then sent out to appropriate personnel, as needed.

According to some embodiments, the ML model 410 can categorize problematic features at the application level (e.g., at the Kafka consumer level) or at the Kafka broker level (as depicted in FIG. 2). Some of these features at the application level may include the CPU, thread or memory utilizations, the disk input/output (I/O) metrics, memory hot swapping, page in/page outs, and time to service or average time of a request. Features at the Kafka broker level include, for example, a number of partitions, a cardinality of the partition, and consumer lag percentage. The features also include reassigning partitions, under-replicated partitions, offline partition count or total partition, log flush latency, consumer message rate, fetcher lag, and incoming/outgoing message rates.

Based on this information, the ML model 410 can perform a prediction action that may include sending a warning where no action is recommended, determining when a warning turns into a critical issue, and determine a critical issue or a false alarm. The ML model 410 can also determine a percentage of instances to scale up and actions to be taken on affected consumers.

According to yet another embodiment, XGBoost, a known supervised learning algorithm may be employed within the ML model 410 in which gradient boosting techniques are implemented. In this embodiment, a decision tree is built based on different feature conditions and the assembling thereof is performed using gradient boosting techniques to additively generate weak models and set targeted outcomes for the next ones to minimize errors.

Figure 5:
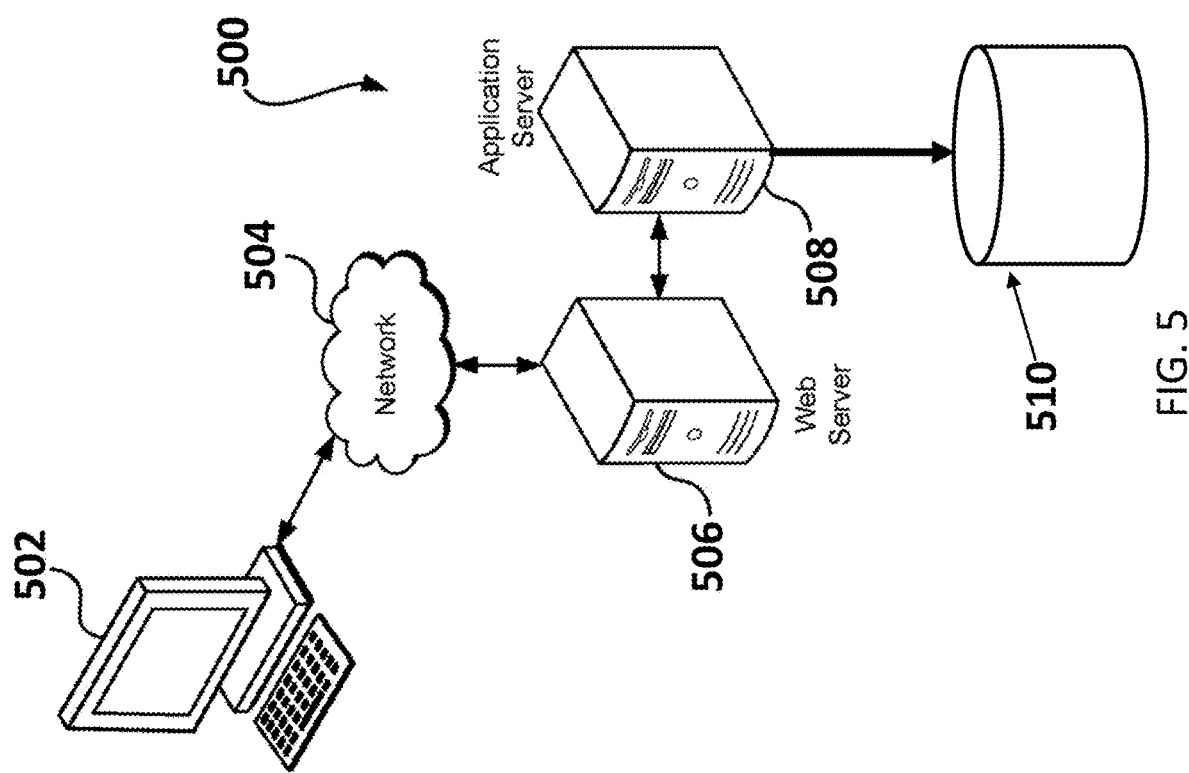
FIG. 5 illustrates an exemplary environment in which various embodiments of the present disclosure can be implemented.

FIG. 5 illustrates an example environment 500 for hosting the Kafka-based monitoring application 110 in which various embodiments of the present disclosure can be implemented. The environment 500 can be a GKP platform environment. As will be appreciated, although a web-based environment is used for purposes of explanation, different environments may be used, as appropriate, to implement various embodiments.

The environment includes an electronic device 502, which can include any appropriate device operable to send and/or receive requests, messages, or information over an appropriate network 504 and, in some embodiments, convey information back to a user of the device. Examples of such electronic devices 502 include personal computers, cell phones, handheld messaging devices, laptop computers, tablet computers, set-top boxes, personal data assistants, embedded computer systems, electronic book readers, and the like.

The network 504 can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network 504 includes the Internet and/or other publicly addressable communications network. As the environment includes a web server 506 for receiving requests and serving content in response thereto, although for other networks an alternative device serving a similar purpose could be used as would be apparent to one of ordinary skill in the art.

The illustrative environment includes at least one application server 508 and a data store 510. It should be understood that there can be several application servers, layers or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system.

As used herein, unless otherwise stated or clear from context, the term "datastore" or "data store" refers to any device or combination of devices capable of storing, accessing, and retrieving data, which may include any combination and number of data servers, databases, data storage devices, and data storage media, in any standard, distributed, virtual, or clustered environment.

The application server 508 can include any appropriate hardware, software, and firmware for integrating with the data store 510 as needed. The hardware, software, and firmware may execute aspects of one or more applications for the electronic device 502, handling some or all of the data access and business logic for an application.

The application server 508 may provide access control services in cooperation with the data store 510 and is able to generate content including. The content may include text, graphics, audio, video, and/or other content usable to be provided to the user, which may be served to the user by the web server 506. The content may be served in the form of Hypertext Markup Language (HTML), Extensible Markup Language (XML), JavaScript, Cascading Style Sheets (CSS), JavaScript Object Notation (JSON), and/or another appropriate client-side structured language.

Content transferred to an electronic device 502 may be processed by the electronic device 502 to provide the content in one or more forms including, but not limited to, forms that are perceptible to the user audibly, visually, and/or through other senses. The handling of all requests and responses, as well as the delivery of content between the electronic device 502 and the application server 508, can be handled by the web server 506 using PHP: Hypertext Preprocessor (PHP), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system illustrated in the example environment 500 in FIG. 5 should be taken as being illustrative in nature and not limiting to the scope of the disclosure.

Where a system includes computerized devices, each such device can include hardware elements that may be electrically coupled via a bus, the elements including, for example, at least one CPU or processor, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Although the invention has been described with reference to several exemplary embodiments, it is understood that the words that have been used are words of description and illustration, rather than words of limitation. Changes may be made within the purview of the appended claims, as presently stated, and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium (CRM) may be described as a single medium and includes a single medium or multiple media, such as a centralized or distributed database, and/or associated caches and servers that store one or more sets of instructions. The term CRM may also include any medium capable of storing, encoding or carrying a set of instructions for execution by a processor or that cause a computer system to perform any one or more of the embodiments disclosed herein.

The CRM may comprise a non-transitory CRM or media and/or comprise a transitory CRM or media. In a particular non-limiting, exemplary embodiment, the CRM can include a solid-state memory such as a memory card or other package that houses one or more non-volatile read-only memories.

Further, the CRM can be a random-access memory or other volatile re-writable memory. Additionally, the CRM can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein.

Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure.

Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The present disclosure provides the advantages of lag-based autoscaling for consumers, application status alerts/notifications, easy onboarding of applications including no application changes required or services needed, configuration-based lag threshold, platform agnosticism, decoupling capability from an application being monitored, intelligent autoscaling based on the lag as well as downscaling operations.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for managing dynamic messaging using a Kafka-based monitoring application deployed within a cloud environment having at least one software application in operation, the method comprising:
    monitoring, via the Kafka-based monitoring application, consumer lag for a specific topic associated with the at least one software application;
    scheduling queries, via the Kafka-based monitoring application, to detect consumer lag for the specific topic at predetermined intervals;
    detecting, via an application programming interface in communication with the Kafka-based monitoring application, any consumer lag and retrieving a list of any affected consumers and associated consumer information; and
    determining one or more pools of the affected consumers, and performing a scaling operation to scale up or down consumers on the one or more pools based on the consumer lag detected.

2. The method of claim 1, wherein detection of any consumer lag further comprises:
    determining whether the consumer lag exceeds a preconfigured lag threshold associated with the at least one software application.

3. The method of claim 1, wherein when no consumer lag is detected, determining, via the Kafka-based monitoring application whether to scale down a number of consumers at the one or more pools, and scaling down the number of consumers when determined.

4. The method of claim 1, wherein when consumer lag is detected on the one or more pools, shutting down any affected consumers on the one or more pools and adding an equivalent number of consumers to one or more unaffected pools.

5. The method of claim 4, further comprising detecting actual consumer lag, and adding a number of new consumer instances based on the actual consumer lag detected.

6. The method of claim 1, further comprising:
    performing auto-scaling up and down of consumers, via the Kafka-based monitoring application, within one or more pools when consumer lag exists.

7. The method of claim 1, further comprising:
    performing schedule-based auto-scaling of consumers, via the Kafka-based monitoring application, to scale consumer instances up and down to accommodate any event traffic on the at least one software application, wherein when a burst of events is expected during a predetermined period of time, scheduling the scaling up of new consumer instances during that predetermined period of time; and
    automatically scaling down any consumers associated with the new consumer instances when the predetermined period of time lapses.

8. The method of claim 5, further comprising:
    performing intelligent-based scaling, via the Kafka-based monitoring application, based on the actual consumer lag by determining and adding a number of new consumer instances required to remove the actual consumer lag.

9. The method of claim 8, further comprising:
    performing downscaling once the actual consumer lag goes down by shutting down the number of new consumer instances added, to return the at least one software application back to an original configuration.

10. The method of claim 9, further comprising:
    adding new pools, via the Kafka-based monitoring application, where the at least one software application is not already deployed, when it is determined that there is not sufficient capacity on the one or more pools to add the number of new consumer instances.

11. The method of claim 1, further comprising:
storing historical data associated with actions taken by the Kafka-based monitoring application within a database, and training a machine language model to predict actions to be taken by the Kafka-based monitoring application, based on the historical data stored; and
performing a scaling operation based on the predicted actions to be taken.

12. A system for managing dynamic messaging within a cloud environment having at least one software application in operation comprising:
a processor; and
a Kafka-based monitoring application performing operations via the processor, the processor being configured to:
monitor consumer lag for a specific topic associated with the at least one software application;
schedule queries to detect consumer lag for the specific topic at predetermined intervals;
detecting, via an application programming interface in communication with the Kafka-based monitoring application, any consumer lag and retrieve a list of any affected consumers and associated consumer information; and
determine one or more pools of the affected consumers, and perform a scaling operation to scale up or down consumers on the one or more pools based on the consumer lag detected.

13. The system of claim 12, wherein the processor is further configured to:
determine whether the consumer lag exceeds a pre-configured lag threshold associated with the at least one software application.

14. The system of claim 12, wherein when no consumer lag is detected, the processor is further configured to:
determine whether to scale down a number of consumers at the one or more pools, and scaling down the number of consumers when determined.

15. The system of claim 12, wherein when consumer lag is detected on the one or more pools, the processor is further configured to:
shut down any affected consumers on the one or more pools and adding an equivalent number of consumers to one or more unaffected pools.

16. The system of claim 15, wherein the processor is further configured to perform auto-scaling up and down of consumers within the one or more pools when consumer lag exists.

17. The system of claim 12, wherein the processor is further configured to:
perform schedule-based auto-scaling of consumers, to scale consumer instances up and down to accommodate any event traffic on the at least one software application, wherein when a burst of events is expected during a predetermined period of time, scheduling the scaling up new consumer instances during that predetermined period of time; and automatically scaling down any consumers associated with the new of consumer instances when the predetermined period time lapses.

18. The system of claim 12, wherein the processor is further configured to perform intelligent-based scaling, based on actual consumer lag by determining and adding a number of new consumer instances required to remove the actual consumer lag; and
perform downscaling once the actual consumer lag goes down by shutting down the number of new consumer instances added, to return the at least one software application back to an original configuration.

19. A non-transitory computer-readable medium having stored thereon, computer executable instructions that, if executed by a computing device, cause the computing device to perform a method for managing dynamic messaging using a Kafka-based monitoring application deployed within a cloud environment having at least one software application in operation, the method comprising:
monitoring, via the Kafka-based monitoring application, consumer lag for a specific topic associated with the at least one software application;
scheduling queries, via the Kafka-based monitoring application, to detect consumer lag for the specific topic at predetermined intervals;
detecting, via an application programming interface in communication with the Kafka-based monitoring application, any consumer lag and retrieving a list of any affected consumers and associated consumer information; and
determining one or more pools of the affected consumers, and performing a scaling operation to scale up or down consumers on the one or more pools based on the consumer lag detected.

20. The non-transitory computer-readable medium of claim 19, wherein detection of any consumer lag further comprises:
determining whether the consumer lag exceeds a pre-configured lag threshold associated with the at least one software application.

* * * * *